(12) United States Patent
Zeng et al.

(10) Patent No.: US 12,706,704 B2
(45) Date of Patent: Aug. 11, 2026

(54) COMMUNICATION PROCESSING METHOD AND APPARATUS AND COMMUNICATION DEVICE

(71) Applicant: VIVO MOBILE COMMUNICATION CO., LTD., Chang'an (CN)

(72) Inventors: Chaojun Zeng, Chang'an (CN); Na Li, Chang'an (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 500 days.

(21) Appl. No.: 18/329,998

(22) Filed: Jun. 6, 2023

(65) Prior Publication Data

US 2023/0318755 A1 Oct. 5, 2023

Related U.S. Application Data

(63) Continuation of application No. PCT/CN2021/138724, filed on Dec. 16, 2021.

(30) Foreign Application Priority Data

Dec. 18, 2020 (CN) .......................... 202011511911.2

(51) Int. Cl.
*H04L 1/1829* (2023.01)
*H04W 76/28* (2018.01)

(52) U.S. Cl.
CPC .......... *H04L 1/1861* (2013.01); *H04L 1/1854* (2013.01); *H04W 76/28* (2018.02)

(58) Field of Classification Search
CPC ... H04L 1/1861; H04L 1/1854; H04L 5/0016; H04L 5/1469; H04L 1/1614;
(Continued)

(56) References Cited

U.S. PATENT DOCUMENTS

2019/0289586 A1 9/2019 Ouchi et al.
2019/0306878 A1 10/2019 Zhang et al.
(Continued)

FOREIGN PATENT DOCUMENTS

CN 110943806 A 3/2020
CN 111385080 A 7/2020
(Continued)

OTHER PUBLICATIONS

3GPP TS 38.213 V16.3.0 (Sep. 2020) Technical Specification 3rd Generation Partnership Project Technical Specification Group Radio Access Network NR Physical Layer Procedures for Control (Year: 2020).*

(Continued)

*Primary Examiner* — Charles C Jiang
*Assistant Examiner* — Margaret Marie Anderson

(57) ABSTRACT

This application discloses a communication processing method and apparatus and a communication device, and pertains to the field of wireless communication technologies. The method includes: performing a predetermined operation based on a transmission time of a target physical downlink shared channel PDSCH, where the target PDSCH is configured as having no feedback of target hybrid automatic repeat request acknowledgement HARQ-ACK information, or there is feedback delay for target HARQ-ACK information corresponding to the target PDSCH. The predetermined operation includes at least one of the following: determining whether the target PDSCH corresponds to a nominal HARQ-ACK feedback time unit; determining an effective time of a target medium access control control element MAC CE; determining a target HARQ-ACK codebook corresponding to the target PDSCH; determining application of a first rule; and determining start of a target discontinuous reception DRX timer.

20 Claims, 4 Drawing Sheets

(58) Field of Classification Search
CPC ... H04L 1/1822; H04L 1/1851; H04L 5/0044; H04L 5/0055; H04L 5/0082; H04L 5/0092; H04L 1/1812; H04L 1/1848; H04L 5/0053; H04W 76/28; H04W 72/11
See application file for complete search history.

(56) References Cited

U.S. PATENT DOCUMENTS

| | | | | |
|---|---|---|---|---|
| 2021/0314095 | A1 | 10/2021 | Gao | |
| 2022/0264614 | A1* | 8/2022 | Yu | H04L 1/1825 |
| 2022/0376844 | A1* | 11/2022 | Muruganathan | H04W 72/23 |
| 2023/0397292 | A1* | 12/2023 | Park | H04L 1/1861 |

FOREIGN PATENT DOCUMENTS

| | | | | |
|---|---|---|---|---|
| WO | 2020057639 | A1 | 3/2020 | |
| WO | 2020222693 | A1 | 11/2020 | |
| WO | WO-2021184317 | A1 * | 9/2021 | H04L 5/00 |

OTHER PUBLICATIONS

First Japanese Office Action related to Japanese Application No. 2023-535044, reported on Aug. 5, 2025.
Extended European Search Report related to Application No. 21905775.9, reported on May 22, 2024.
International Search Report and Written Opinion related to Application No. PCT/CN2021/138724; reported on Feb. 28, 2022.
R1-2008361—Source: Sony “Enhancements on HARQ for NTN”, Agenda Item: 8.4.3, Document for: Discussion, 3GPP TSG RAN WG1 Meeting #103-e, E-meeting, Oct. 26-Nov. 13, 2020.
R2-2009108—Source: OPPO “HARQ impact on MAC procedures in NTN”, Agenda Item: 8.10.2.2, Document for: Discussion, Decision, 3GPP TSG-RAN WG2 Meeting #112 electronic, Online, Nov. 2-13, 2020.
Indian Examination Report Office Action related to application No. 202317037795, reported on Apr. 30, 2026.
Japanese Notice of Reasons for Refusal Office Action related to application No. 2025-061287, reported on Mar. 31, 2026.
Ericsson, TP for Section 6.2 in TR 38.821 on NTN PHY control procedures, Nov. 18-22, 2019, Agenda Item: 7.2.5, R1-1913402, 3GPP TSG-RAN WG1 Meeting #99 Reno, USA.
Qualcomm Incorporated, Enhancements on Timing Relationship for NTN, Aug. 17-28, 2020, Agenda item: 8.4.1, R1-2006804, 3GPP TSG RAN WG1 #102-e, e-Meeting.
Vivo, Harq-Ack enhancements for Rel-17 URLLC, Oct. 26-Nov. 13, 2020, Agenda Item: 8.3.1.1, R1-2007655, 3GPP TSG RAN WG1#103-e, e-Meeting.
LG Electronics, Discussion on UE feedback enhancement for HARQ-ACK, Oct. 26-Nov. 13, 2020, Agenda Item: 8.3.1.1, R1-2008057, 3GPP TSG RAN WG1 #103-e, e-Meeting.

* cited by examiner

200

S210

Perform a predetermined operation based on a transmission time of a target PDSCH

300

S310

Perform a predetermined operation based on a transmission time of a target PDSCH

400

COMMUNICATION PROCESSING METHOD AND APPARATUS AND COMMUNICATION DEVICE

CROSS-REFERENCE TO RELATED APPLICATIONS

The present invention is a continuation application of PCT International Application No. PCT/CN2021/138724 filed on Dec. 16, 2021, which claims priority to Chinese Patent Application No. 202011511911.2, filed with the China National Intellectual Property Administration on Dec. 18, 2020 and entitled "COMMUNICATION PROCESSING METHOD AND APPARATUS AND COMMUNICATION DEVICE", which is incorporated herein by reference in its entirety.

TECHNICAL FIELD

This application pertains to the field of wireless communication technologies and specifically relates to a communication processing method and apparatus and a communication device.

BACKGROUND

In related communication technologies, taking a semi-persistent scheduling physical downlink shared channel (SPS PDSCH) as an example, in a case that a hybrid automatic repeat request acknowledgement (HARQ-ACK) disabling scheme (that is, disabling, turning off, or skipping HARQ-ACK feedback) is adopted for SPS PDSCH, or in a case that there is feedback delay for HARQ-ACK corresponding to SPS PDSCH, some functions that rely on or are associated with HARQ-ACK feedback may not be executed normally, resulting in degraded communication performance.

SUMMARY

According to a first aspect, a communication processing method is provided, including: performing a predetermined operation based on a transmission time of a target physical downlink shared channel PDSCH, where the target PDSCH is configured as having no feedback of target hybrid automatic repeat request acknowledgement HARQ-ACK information, or there is feedback delay for target HARQ-ACK information corresponding to the target PDSCH; the predetermined operation includes at least one of the following: determining whether the target PDSCH corresponds to a nominal HARQ-ACK feedback time unit; determining an effective time of a target medium access control control element MAC CE, where the target MAC CE is carried on the target PDSCH; determining a target HARQ-ACK codebook corresponding to the target PDSCH; determining application of a first rule, where the first rule characterizes a timing relationship requirement between the target PDSCH and a feedback time corresponding to the target HARQ-ACK information; and determining start of a target discontinuous reception DRX timer, where the target DRX timer corresponds to a first HARQ process, and the first HARQ process corresponds to the target PDSCH.

According to a second aspect, a communication processing apparatus is provided, including: an execution module, configured to perform a predetermined operation based on a transmission time of a target physical downlink shared channel PDSCH, where the target PDSCH is configured as having no feedback of target hybrid automatic repeat request acknowledgement HARQ-ACK information, or there is feedback delay for target HARQ-ACK information corresponding to the target PDSCH. The predetermined operation includes at least one of the following: determining whether the target PDSCH corresponds to a nominal HARQ-ACK feedback time unit; determining an effective time of a target medium access control control element MAC CE, where the target MAC CE is carried on the target PDSCH; determining a target HARQ-ACK codebook corresponding to the target PDSCH; determining application of a first rule, where the first rule characterizes a timing relationship requirement between the target PDSCH and a feedback time corresponding to the target HARQ-ACK information; and determining start of a target discontinuous reception DRX timer, where the target DRX timer corresponds to a first HARQ process, and the first HARQ process corresponds to the target PDSCH.

According to a third aspect, a communication device is provided, including a processor, a memory, and a program or instructions stored in the memory and capable of running on the processor, where when the program or the instructions are executed by the processor, the steps of the communication processing method according to the first aspect are implemented.

According to a fourth aspect, a readable storage medium is provided, where a program or instructions are stored in the readable storage medium, and when the program or the instructions are executed by a processor, the steps of the communication processing method according to the first aspect are implemented.

According to a fifth aspect, a chip is provided, where the chip includes a processor and a communication interface, the communication interface is coupled to the processor, and the processor is configured to run a program or instructions to implement the method according to the first aspect.

According to a sixth aspect, a computer program product is provided, where the computer program product includes a processor, a memory, and a program or instructions stored in the memory and capable of running on the processor, and when the program or the instructions are executed by the processor, the steps of the method according to the first aspect are implemented.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms "first", "second", and the like are intended to distinguish between similar objects rather than to describe a specific order or sequence. It should be understood that data used in this way is used interchangeably in appropriate circumstances so that the embodiments of this application can be implemented in other orders than the order illustrated or described herein. In addition, the objects distinguished by "first" and "second" usually belong to one category, and the number of objects is not limited. For example, there may be one or more first objects. In addition, in the specification and claims, "and/or" indicates at least one of connected objects, and the symbol "/" generally indicates that the associated objects have an "or" relationship.

It should be noted that technologies described in the embodiments of this application are not limited to the long term evolution (LTE) or LTE-Advanced (LTE-A) system, but may also be applied to other wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The technologies described herein may be used in the above-mentioned systems and radio technologies as well as other systems and radio technologies. However, in the following descriptions, the new radio (NR) system is described for an illustration purpose, and NR terms are used in most of the following descriptions. These technologies may also have other applications than the application in NR system, for example, being used in the 6th generation (6G) communication system.

Figures 1, 2, 3:
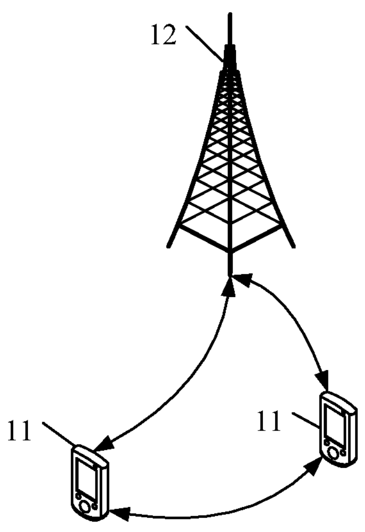
FIG. 1 is a schematic diagram of a wireless communication system according to an example embodiment of this application.
FIG. 2 is a schematic flowchart of a communication processing method according to an example embodiment of this application.
FIG. 3 is a schematic flowchart of a communication processing method according to another example embodiment of this application.

FIG. 1 is a block diagram of a wireless communication system to which the embodiments of this application are applicable. The wireless communication system includes a terminal 11 and a network device 12. The terminal 11 may also be referred to as a terminal device or user terminal (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes: wrist bands, earphones, glasses, and the like. It should be noted that the specific type of the terminal 11 is not limited in the embodiments of this application. The network device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission-reception point (TRP), or other appropriate terms in the art. Provided that the same technical effects are achieved, the base station is not limited to any specific technical term. It should be noted that in the embodiments of this application, only the base station in the NR system is used as an example, but the specific type of the base station is not limited.

The following describes in detail the technical solutions provided in the embodiments of this application by using specific embodiments and application scenarios thereof with reference to the accompanying drawings.

FIG. 2 is a schematic flowchart of a communication processing method 200 according to an example embodiment of this application. The method 200 may be applied to a communication device, such as a terminal and a network device, and specifically may be performed by software and/or hardware installed in the communication device.

The method 200 may include the following steps.

S210. Perform a predetermined operation based on a transmission time of a target PDSCH.

The target PDSCH is configured as having no feedback of target HARQ-ACK information. For example, a HARQ-ACK disabling scheme is used or configured for the target PDSCH, where the HARQ-ACK disabling scheme is used to reduce feedback overheads. For example, assuming that the target PDSCH is an SPS PDSCH, in a case that the HARQ-ACK disabling scheme has been configured for the SPS PDSCH, no feedback of HARQ-ACK information is required for transmission of the SPS PDSCH, but when the network device configures transmission resources and attributes and activates the SPS PDSCH, correct transmission of the corresponding SPS PDSCH can be ensured.

Alternatively, there is feedback delay for the target HARQ-ACK information corresponding to the target PDSCH. For example, in a time division duplex (TDD) system, feedback may not be implemented at a predefined feedback position for an SPS HARQ-ACK corresponding to a target PDSCH due to direction collision of transmission resources at the predefined feedback position, and therefore feedback needs to be delayed.

In this embodiment, the target PDSCH may be an SPS PDSCH or the like. Correspondingly, the target HARQ-ACK information may be SPS HARQ-ACK information corresponding to the SPS PDSCH. In some cases, the target PDSCH may alternatively be a dynamically scheduled PDSCH. Alternatively, the target PDSCH may further be extended to a target physical uplink shared channel (PUSCH), such as a configured grant (CG) PUSCH. In this case, the target HARQ-ACK information may correspond to the PUSCH and is sent by the network device to the terminal, for example, the target HARQ-ACK information corresponds to configured grant downlink feedback information (CG-DFI) in NR-U. This is not limited in this embodiment.

It should be noted that for ease of description, in subsequent embodiments, in a case that an SPS configuration (SPS Config) of the target PDSCH has been configured with the HARQ-ACK disabling scheme, an SPS PDSCH corresponding to the SPS Config may also be hereinafter referred to as a non-feedback SPS PDSCH, while SPS PDSCHs corresponding to other SPS Configs (which have not been configured with HARQ-ACK disabling) are hereinafter referred to as normal SPS PDSCHs. SPS PDSCHs mentioned hereinafter refer to SPS PDSCH transmissions corresponding to SPS Config, including non-feedback SPS PDSCHs and normal SPS PDSCHs.

Further, the predetermined operation may include at least one of the following (1)-(5).

(1) Determining Whether the Target PDSCH Corresponds to a Nominal HARQ-ACK Feedback Time Unit.

For an SPS PDSCH, for example, the nominal HARQ-ACK feedback time unit can be understood as that when a HARQ-ACK feedback time or HARQ-ACK feedback time unit of the SPS PDSCH needs to be used, the nominal HARQ-ACK feedback time unit or a time corresponding to the nominal HARQ-ACK feedback time unit (that is, a nominal HARQ-ACK feedback time, for example, the time corresponding to the nominal HARQ-ACK feedback time unit may be an end time of the time unit) can be used, ensuring that subsequent functions or procedures that rely on the HARQ-ACK feedback time or HARQ-ACK feedback time unit of the SPS PDSCH can be executed smoothly.

For a non-feedback SPS PDSCH (that is, an SPS PDSCH corresponding to SPS Config configured as having no feedback of HARQ-ACK information), although a higher layer has been configured as not requiring HARQ-ACK feedback, each non-feedback SPS PDSCH may still have a corresponding HARQ-ACK feedback time, that is, a nominal HARQ-ACK feedback time or a nominal HARQ-ACK feedback time unit; or certainly, each non-feedback SPS PDSCH may have no corresponding nominal HARQ-ACK feedback time unit.

Optionally, when a non-feedback SPS PDSCH has a corresponding nominal HARQ-ACK feedback time unit, in the nominal HARQ-ACK feedback time unit or at the nominal HARQ-ACK feedback time (for example, the nominal HARQ-ACK feedback time is determined based on an end time of the nominal HARQ-ACK feedback time unit), the non-feedback SPS PDSCH, that is, the target PDSCH, may have been acknowledged as having been successfully transmitted. As a result, the nominal HARQ-ACK feedback time unit or nominal HARQ-ACK feedback time may also be used as a successful transmission time of the target PDSCH.

For an SPS PDSCH whose HARQ-ACK information has feedback delay (for example, in a TDD system, there is feedback delay for the HARQ-ACK information of the SPS PDSCH because resources at a predefined feedback time position are unavailable), the concept of nominal HARQ-ACK feedback time unit or nominal HARQ-ACK feedback time may also be introduced. In this case, the nominal HARQ-ACK feedback time unit or nominal HARQ-ACK feedback time may be determined based on a predefined/pre-indicated feedback time unit/feedback time or based on other manners.

(2) Determining an Effective Time of a Target Medium Access Control Control Element (MAC CE).

The target MAC CE is carried on the target PDSCH. In NR, MAC CE-based indication has been introduced for multiple functions. This manner corresponds to L2 signaling. In this embodiment, determining the effective time of the target MAC CE based on a transmission time of the target PDSCH can avoid or resolve a problem that a HARQ-ACK feedback time is unavailable or ambiguous when the effective time of the target MAC CE is determined based on the HARQ-ACK feedback time, and ensure normal execution of the MAC CE-based indication function or procedure (that is, the effective time of the MAC CE is clearly defined and consistent understanding is ensured between a network side and a terminal side). It can be understood that the target MAC CE carried on the target PDSCH is a downlink MAC CE. When this embodiment is extended to PUSCH, correspondingly, the specified MAC CE may be an uplink MAC CE.

(3) Determining a Target HARQ-ACK Codebook Corresponding to the Target PDSCH.

Non-feedback SPS PDSCH transmission generally has no corresponding HARQ-ACK feedback bit, or no corresponding HARQ-ACK codebook. However, in NR Rel-15/16, to avoid inconsistent understanding of codebook size (codebook size, that is, length of a HARQ-ACK bit sequence corresponding to a codebook) between two sides (that is, the terminal and the network device) caused by missed detection on DCI, some types of HARQ-ACK codebooks use a semi-persistent scheduling codebook size. In this case, codebook size does not rely on downlink data scheduling or transmission. HARQ-ACK bits corresponding to the non-feedback SPS PDSCH transmission may still be present in the codebook, and setting of these HARQ-ACK bits at a transmit end and understanding of these HARQ-ACK bits at a receive end need to be correspondingly specified. For these HARQ-ACK codebook types, reference may be made to the type-2 HARQ-ACK codebook mentioned in subsequent embodiments. In addition, for some other types of HARQ-ACK codebooks, setting of HARQ-ACK bits included and values thereof relies on downlink data scheduling or transmission. For these HARQ-ACK codebook types, reference may be made to the type-1 HARQ-ACK codebook mentioned in subsequent embodiments.

For different HARQ-ACK codebook types mentioned above, corresponding rules are required for a correspondence between non-feedback SPS PDSCH transmission (which can be used as a case of the target PDSCH) and a specific codebook (which can be understood as the target HARQ-ACK codebook) corresponding to a HARQ-ACK codebook type, as well as setting of HARQ-ACK bits in this specific codebook, so as to ensure consistent understanding between two sides. In this embodiment, the target HARQ-ACK codebook can be determined based on the transmission time of the target PDSCH, so as to ensure consistent understanding of two sides on a correspondence between PDSCHs and HARQ-ACK codebooks and setting of HARQ-ACK bits in the HARQ-ACK codebooks.

(4) Determining Application of a First Rule.

The first rule characterizes a timing relationship requirement between the target PDSCH and a feedback time corresponding to the target HARQ-ACK information. For example, it is required that HARQ-ACK feedback of a PDSCH that starts being transmitted earlier is not later than HARQ-ACK feedback of a PDSCH that starts being transmitted later, so as to ensure that operations of the terminal side receiving downlink control information (DCI), receiving PDSCH, reporting HARQ-ACK, and the like can be executed in a pipelined manner, thereby avoiding disorder and reducing implementation complexity of the terminal. It should be understood that the foregoing first rule can also be understood as an Out-of-Order rule or OoO rule, or a guaranteed-order rule, or a disorder avoidance rule.

In this embodiment, the application of the first rule is determined based on the transmission time of the target PDSCH, which can ensure the consistent understanding of the terminal and the network side on limitations on the operations such as receiving scheduling DCI, receiving PDSCH and reporting HARQ-ACK, and ensure smooth implementation of downlink PDSCH transmission and HARQ-ACK feedback, thereby ensuring downlink data transmission performance.

(5) Determining Start of a Target Discontinuous Reception (DRX) Timer.

The target DRX timer corresponds to a first HARQ process, and the first HARQ process corresponds to the target PDSCH.

For a non-feedback SPS PDSCH, when a higher layer is configured with a HARQ-ACK disabling scheme, it has been assumed or expected that the non-feedback SPS PDSCH can be transmitted correctly at one time without HARQ retransmission. Therefore, in a DRX mechanism, for a HARQ process corresponding to the non-feedback SPS PDSCH transmission, corresponding DRX timers may not be started, so as to simplify implementation of the terminal. Certainly, in an implementation, the corresponding DRX timers or some of the corresponding DRX timers may alternatively be started.

In this embodiment, whether to start the target DRX timer or not is determined based on the transmission time of the target PDSCH, which can ensure that the terminal and the network side have consistent understanding on a state and a time period for monitoring a downlink control channel, thereby ensuring performance of radio interface data transmission.

It can be understood that the predetermined operation may include one or more of the foregoing operations (1)-(5), and may be specifically determined based on actual communication requirements. This is not limited in this embodiment.

In the embodiments of this application, in a case that a target PDSCH is configured as having no feedback of target HARQ-ACK information or there is feedback delay for target HARQ-ACK information corresponding to the target PDSCH, a predetermined operation can be performed based on a transmission time of the target PDSCH. The predetermined operation includes at least one of the following: determining whether the target PDSCH corresponds to a nominal HARQ-ACK feedback time unit; determining an effective time of a target MAC CE; determining a target HARQ-ACK codebook corresponding to the target PDSCH; determining application of a first rule; and determining start of a target DRX timer. In this way, functions that rely on or are associated with HARQ-ACK feedback can be executed normally, ensuring communication performance.

FIG. 3 is a schematic flowchart of a communication processing method 300 according to an example embodiment of this application. The method 300 may be applied to a communication device, such as a user terminal and a network device, and may be specifically performed by hardware and/or software installed in the communication device. The method 300 may include the following steps.

S310. Perform a predetermined operation based on a transmission time of a target physical downlink shared channel PDSCH.

For an implementation process of S310, reference may be made to related descriptions in S210. Besides, in this embodiment, the implementation process of S310 varies with the target PDSCH and/or the predetermined operation. The implementation process of S310 is further described in this embodiment with reference to different examples.

Example 1

In a case that the predetermined operation is determining whether the target PDSCH corresponds to a nominal HARQ-ACK feedback time unit, the determining whether the target PDSCH corresponds to a nominal HARQ-ACK feedback time unit may include any one of the following (1) and (2).

(1) The target PDSCH not corresponding to a first nominal HARQ-ACK feedback time unit.

In an implementation, in a case that the target PDSCH is a non-feedback PDSCH, the target PDSCH does not correspond to (or has no) the first nominal HARQ-ACK feedback time unit (that is, the nominal HARQ-ACK feedback time unit).

(2) The target PDSCH corresponding to the first nominal HARQ-ACK feedback time unit.

In a case that the target PDSCH corresponds to a first nominal HARQ-ACK feedback time unit, the first nominal HARQ-ACK feedback time unit is determined in any one of the following manners (21) and (22).

(21) Determining the first nominal HARQ-ACK feedback time unit based on the transmission time and a first time indicated by predetermined indication information.

The transmission time is a transmission end time of the target PDSCH, or the transmission time is a time unit to which the transmission end time of the target PDSCH belongs. The time unit in which the transmission end time of the target PDSCH described herein may be understood as a time unit in an uplink direction or an uplink time unit, and may specifically be an uplink slot, an uplink sub-slot, or other predefined durations in the uplink direction.

It can be understood that if the target PDSCH is in a time unit n' in a downlink direction (that is, a downlink time unit n') and the transmission end time of the target PDSCH is in a time unit n in an uplink direction (that is, an uplink time unit n), n' and n are not necessarily equal, the downlink time unit n' and the uplink time unit n may overlap in time domain, but do not necessarily coincide fully with each other, and a corresponding time period of the target PDSCH transmission is not necessarily located fully within the uplink time unit n. This is related to parameters such as subcarrier spacings that are respectively configured for the uplink direction and the downlink direction. In other words, lengths of time units in the uplink direction and the downlink direction may be equal or unequal. In this embodiment, for ease of understanding, the uplink time unit n to which the transmission end time of the target PDSCH belongs can be used as the transmission time. In addition, the time unit may include but is not limited to any one of a symbol (OFDM), a sub-slot, and a slot.

The predetermined indication information may include activation downlink control information (DCI), reactivation DCI, or higher-layer signaling (such as radio resource control signaling). In a case that the target PDSCH is an SPS PDSCH, the activation DCI/reactivation DCI is used for implementing activation or reactivation of a series of SPS PDSCHs including the target PDSCH.

In an implementation, taking an SPS Config as an example, after the SPS Config is activated or reactivated by downlink DCI, relative timing of HARQ-ACK feedback for a PDSCH transmission scheduled by the activation DCI or reactivation DCI is indicated by a PDSCH-to-HARQ_feedback timing indicator field (namely, a timing indicator field between a PDSCH and HARQ-ACK feedback) in the activation DCI or reactivation DCI or a higher-layer parameter dl-DataToUL-ACK (when the DCI does not include the timing indicator field between the PDSCH and HARQ-ACK feedback). For example, assuming that a value indicated by the PDSCH-to-HARQ_feedback timing indicator field in the activation DCI or reactivation DCI or the higher-layer parameter dl-DataToUL-ACK is k, an end time of the PDSCH transmission scheduled by the activation DCI or reactivation DCI is in an uplink slot n, and a corresponding HARQ-ACK feedback time unit is n+k. After the PDSCH transmission and before release, a series of PDSCH transmissions or transmission occasions that are present periodically, that is, SPS PDSCHs, can be used as a type of target PDSCHs. An offset between an uplink time unit to which the end time of these SPS PDSCHs or the target PDSCH belongs and a first time or first time unit predetermined and indicated by the uplink time unit is still k. That is, assuming that the end time of the target PDSCH is in an uplink time unit n", a corresponding first nominal HARQ-ACK feedback time unit is n"+k.

(22) Determining the first nominal HARQ-ACK feedback time unit based on the transmission time and a predefined duration.

The first nominal HARQ-ACK feedback time unit determined in (22) can be understood as being obtained by delaying the transmission time (that is, a start time) by a predefined duration. It should be noted that for the transmission time, reference may be made to the descriptions in (1), and details are not described herein again.

The predefined duration may include a predetermined quantity of time units. The time unit may include any one of a symbol, a sub-slot, and a slot. In this embodiment, the predefined duration (or the predetermined quantity) may be determined based on a duration required for the terminal to decode the target PDSCH.

For example, the predefined duration may be a duration corresponding to N time domain symbols, or may be simply understood as N time domain symbols. In some cases, a time obtained after applying this predefined duration based on the transmission time may be further rounded up, that is, a corresponding uplink time unit with a start time not later than the time obtained above is taken, or the start time of this uplink time unit or this uplink time unit is used as the first nominal HARQ-ACK feedback time unit corresponding to the target PDSCH. Optionally, when the end time of the target PDSCH transmission is used as the foregoing start time, this manner of determining the predefined duration can be used.

For another example, the predefined duration may alternatively be a duration corresponding to M uplink slots, or may be simply understood as M uplink slots or M time units. Optionally, when an end time of the uplink time unit to which the transmission end time of the target PDSCH belongs is used as the foregoing start time, this manner of determining the predefined duration can be used.

It should be noted that the predefined duration can be configured by higher-layer signaling or specified by a protocol. This is not limited herein.

It can be understood that in this example 1, the nominal HARQ-ACK feedback time unit corresponding to the target PDSCH is determined based on the transmission time of the target PDSCH, so that functions originally implemented depending on the HARQ-ACK feedback time can be continuously executed depending on the nominal HARQ-ACK feedback time unit, effectively guaranteeing the communication performance.

Example 2

In a case that the predetermined operation is determining an effective time of a target MAC CE, the following describes the implementation process of S310 depending on the target PDSCH.

In a first implementation, in a case that the target PDSCH is configured as having no feedback of target HARQ-ACK information, it can be considered that the target PDSCH has been configured by a higher layer as having no feedback of target HARQ-ACK information. In this case, for the effective time of the target MAC CE, a successful transmission time of the target PDSCH can be considered and the effective time of the MAC CE is determined based on this successful transmission time. For example, the successful transmission time of the target PDSCH can be delayed by a predetermined duration (such as 3 ms) to obtain the effective time of the target MAC CE.

In view of this, the following describes a process of determining the effective time of the target MAC CE in any one of the following manners (1)-(4).

(1) Determining the effective time of the target MAC CE based on the transmission time.

For the transmission time, reference may be made to the related descriptions in example 1, and details are not described herein again.

In addition, considering that the target PDSCH has been configured by the higher layer as having no feedback of target HARQ-ACK information, that is, when the higher layer is configured with HARQ-ACK disabling, it has been assumed or expected that non-feedback SPS PDSCH is transmitted correctly at one time without HARQ retransmission, it can be considered that at the transmission end time (that is, the transmission time) of the target PDSCH, the target PDSCH has been successfully transmitted. Therefore, the successful transmission time of the target PDSCH can be determined directly based on the transmission time, that is, the successful transmission time of the target PDSCH may be the transmission end time of the target PDSCH or the time unit to which the transmission end time of the target PDSCH belongs.

Finally, the effective time of the target MAC CE is determined based on the successful transmission time of the target PDSCH.

It can be understood that in this case, in determining the effective time of the target MAC CE, it is unnecessary to consider a HARQ-ACK feedback time or feedback time unit corresponding to the target PDSCH, or in other words, the effective time of the target MAC CE carried on the target PDSCH is no longer determined based on the HARQ-ACK feedback time or feedback time unit corresponding to the target PDSCH; instead, the effective time of the target MAC CE carried on the target PDSCH is determined based on the transmission time (such as the foregoing successful transmission time) of the target PDSCH.

(2) Determining the effective time of the target MAC CE based on the transmission time and a first time indicated by predetermined indication information.

(3) Determining the effective time of the target MAC CE based on the transmission time and a predefined duration.

It should be noted that considering that a first nominal HARQ-ACK feedback time unit corresponding to the target PDSCH can be used as the successful transmission time of the target PDSCH, in the foregoing (2) and (3), for a process of determining the successful transmission time of the target PDSCH, reference may be made to the descriptions of the process of determining the first nominal HARQ-ACK feedback time unit in the foregoing example 1. The determined first nominal HARQ-ACK feedback time unit is used as the successful transmission time of the target PDSCH, and then the effective time of the target MAC CE is determined based on the successful transmission time of the target PDSCH. To avoid repetition, details are not described herein again.

(4) In a case that the target PDSCH corresponds to a second nominal HARQ-ACK feedback time unit, determining the effective time of the target MAC CE based on the second nominal HARQ-ACK feedback time unit.

The second nominal HARQ-ACK feedback time unit may be the same as the first nominal HARQ-ACK feedback time unit in the foregoing example 1, or the second nominal HARQ-ACK feedback time unit is indicated by higher-layer signaling or specified by a protocol. This is not limited herein.

It can be understood that in a case that the second nominal HARQ-ACK feedback time unit may be the same as the first nominal HARQ-ACK feedback time unit in the foregoing example 1, for a process of determining the second nominal HARQ-ACK feedback time unit, reference may be made to the related descriptions of determining the first nominal HARQ-ACK feedback time unit in the foregoing example 1. This is not described herein again.

Further, the process of determining the effective time of the target MAC CE based on the second nominal HARQ-ACK feedback time unit may include delaying the second nominal HARQ-ACK feedback time unit by a predetermined duration to obtain the effective time of the MAC CE.

In a second implementation, in a case that there is feedback delay for target HARQ-ACK information corresponding to the target PDSCH, the performing a predetermined operation based on a transmission time of a target PDSCH includes any one of the following (1)-(3).

(1) Determining the effective time of the target MAC CE based on the transmission time and a first time indicated by predetermined indication information.

For the process of determining the effective time of the target MAC CE in (1), reference may be made to the foregoing descriptions. To avoid repetition, details are not described herein again.

(2) Determining the effective time of the target MAC CE based on the transmission time and a feedback delay duration.

The transmission time is a transmission end time of the target PDSCH, or the transmission time is a time unit to which the transmission end time of the target PDSCH belongs.

The feedback delay duration k' can be determined based on a feedback delay time of the target HARQ-ACK information, that is, k' can be understood as a time domain offset between an uplink time unit n+k' to which feedback delay for the target HARQ-ACK information belongs and the uplink time unit n to which the transmission end time of the target PDSCH belongs (the time unit herein may be a slot or a sub-slot, and the time domain offset can be understood as a difference at a granularity of time units).

It can be understood that the foregoing manner (2) can also be seen as that a successful transmission time of the target PDSCH is first determined based on the transmission time and a feedback delay duration, and then the effective time of the target MAC CE is determined based on the successful transmission time, for example, the successful transmission time is delayed by a predetermined duration to obtain the effective time of the target MAC CE.

(3) In a case that the target PDSCH corresponds to a second nominal HARQ-ACK feedback time unit, determining the effective time of the target MAC CE based on the second nominal HARQ-ACK feedback time unit.

For an implementation process of the foregoing manner (3), reference may be made to the related descriptions in the foregoing first implementation. For example, the second nominal HARQ-ACK feedback time unit may be the same as the first nominal HARQ-ACK feedback time unit in the foregoing example 1, or the second nominal HARQ-ACK feedback time unit is indicated by higher-layer signaling or specified by a protocol. To avoid repetition, details are not described herein again.

In this example 2, for the target PDSCH, the effective time of the target MAC CE is determined based on the transmission time (for example, the successful transmission time) of the target PDSCH, which can ensure smooth implementation of the process of determining the effective time of the target MAC CE, and ensure consistent understanding of the network side and the terminal on the effective time of the MAC CE, thereby guaranteeing communication performance.

Example 3

The example 3 describes how S310 is implemented in a case that the target PDSCH is configured as having no feedback of target HARQ-ACK information and the predetermined operation is determining a target HARQ-ACK codebook corresponding to the target PDSCH.

In a case that the target PDSCH does not correspond to a second nominal HARQ-ACK feedback time unit, the target PDSCH has no corresponding target HARQ-ACK codebook; or in a case that the target PDSCH corresponds to a second nominal HARQ-ACK feedback time unit, the target PDSCH has a corresponding target HARQ-ACK codebook. For the second nominal HARQ-ACK feedback time unit, reference may be made to the related descriptions in the foregoing example 2. To avoid repetition, details are not described herein again.

It can be understood that the second nominal HARQ-ACK feedback time unit may be the same as the first nominal HARQ-ACK feedback time unit in the foregoing example 1, or the second nominal HARQ-ACK feedback time unit may be indicated by higher-layer signaling or specified by a protocol. To avoid repetition, details are not described herein again.

In this embodiment, the target HARQ-ACK codebook may correspond to a type-1 HARQ-ACK codebook or a type-2 HARQ-ACK codebook. The type-1 HARQ-ACK codebook may include any one of codebook including semi-persistent scheduling HARQ-ACK only (SPS HARQ-ACK only), type-2 codebook (Type-2 codebook), and enhanced (enhanced) Type-2 codebook. The type-2 HARQ-ACK codebook may include Type-1 codebook or Type-3 codebook.

In a first implementation, in a case that the target PDSCH has the corresponding target HARQ-ACK codebook and the target HARQ-ACK codebook corresponds to the type-1 HARQ-ACK codebook, no HARQ-ACK information is reported in the second nominal HARQ-ACK feedback time unit, or first HARQ-ACK information is reported in the second nominal HARQ-ACK feedback time unit, where the first HARQ-ACK information is HARQ-ACK information other than the target HARQ-ACK information. The target HARQ-ACK information herein can be understood as HARQ-ACK information that needs to be carried or reported in the target HARQ-ACK codebook when an SPS Config corresponding to a non-feedback SPS PDSCH is not configured as adopting a HARQ-ACK disabling scheme, and the target HARQ-ACK information corresponds to the non-feedback SPS PDSCH (that is, the target PDSCH). It can be understood that whether the first HARQ-ACK information is reported in the second nominal HARQ-ACK feedback time unit relies on whether the target HARQ-ACK codebook includes the first HARQ-ACK information.

For example, assuming that no HARQ-ACK information (including HARQ-ACK for dynamically scheduled PDSCHs, normal SPS PDSCHs, and SPS release) other than the target HARQ-ACK information corresponding to the target PDSCH needs to be reported in the second nominal HARQ-ACK feedback time unit, no HARQ-ACK is reported in the second nominal HARQ-ACK feedback time unit, which can be understood as that the first HARQ-ACK information is not reported; otherwise, only HARQ-ACK other than the target HARQ-ACK information corresponding to the target PDSCH is reported in the second nominal HARQ-ACK feedback time unit as the reported first HARQ-ACK information.

In this implementation, the number of HARQ-ACK bits in the type-1 HARQ-ACK codebook can be determined based on transmission of the dynamically scheduled or actually transmitted target PDSCH. The transmission can be understood as that time locations and quantity of PDSCH transmissions or DCI indications for which HARQ-ACK needs to be reported in a time unit in which the target HARQ-ACK codebook is located. HARQ-ACK being reported in a designated time unit can be understood as that when a HARQ-ACK feedback time of a PDSCH transmission or DCI indication corresponds to a designated time unit (such as an uplink Slot or an uplink Sub-slot), HARQ-ACK corresponding to this PDSCH transmission or this DCI indication is reported in this designated time unit.

However, it should be noted that in a case that the target HARQ-ACK codebook corresponds to a codebook including semi-persistent scheduling HARQ-ACK only, an SPS HARQ-ACK bit sequence corresponding to the target HARQ-ACK codebook does not include a HARQ-ACK bit or HARQ-ACK bit sequence corresponding to the target PDSCH. The HARQ-ACK bit or HARQ-ACK bit sequence corresponding to the target PDSCH can be understood as target HARQ-ACK information corresponding to the target PDSCH, represented in a form of a HARQ-ACK bit or bit sequence. For example, for the SPS HARQ-ACK only codebook, when an uplink time unit to which a transmission time of the SPS HARQ-ACK only codebook belongs is the second nominal HARQ-ACK feedback time unit, an SPS HARQ-ACK bit sequence is organized in a cyclic order of "Serving cell→SPS Config→DL slot", or the SPS HARQ-ACK bit sequence is determined according to a specified cyclic order of multiple dimensions including Serving cell, SPS Config and DL slot/SPS PDSCH, where a HARQ-ACK bit/bit sequence corresponding to a non-feedback SPS PDSCH needs to be skipped in the cyclic process, meaning that the finally obtained or transmitted SPS HARQ-ACK bit sequence does not include the HARQ-ACK bit or bit sequence corresponding to a non-feedback SPS PDSCH.

In some cases, for the Type-2 codebook or the enhanced Type-2 codebook, when SPS HARQ-ACK is present, a corresponding bit sequence is appended to a dynamically scheduled HARQ-ACK bit sequence. The SPS HARQ-ACK bit sequence may be organized in the same way as that for SPS HARQ-ACK only. Reference may be made to the foregoing corresponding descriptions.

In a second implementation, in a case that the target PDSCH has a corresponding target HARQ-ACK codebook and the target HARQ-ACK codebook corresponds to the type-2 HARQ-ACK codebook, the number of HARQ-ACK bits in the type-2 HARQ-ACK codebook is determined based on a higher-layer semi-static parameter, without relying on transmissions of dynamically scheduled or actually transmitted PDSCHs.

In this embodiment, for compatibility with transmissions of various dynamically scheduled or actually transmitted PDSCHs, corresponding HARQ-ACK bits are reserved in the type-2 HARQ-ACK codebook for PDSCH transmissions (including SPS PDSCHs) in all possible cases. Therefore, for non-feedback SPS PDSCHs, corresponding HARQ-ACK bits may also be present in the type-2 HARQ-ACK codebook. In addition, limited by the attribute of semi-static HARQ-ACK bit quantity, these HARQ-ACK bits cannot be deleted; otherwise, two sides may have inconsistent understandings on the bit quantity or mapping between the bits, for example, in the case of multiplexing with dynamically scheduled HARQ-ACK and missed detection on DCI.

It can be understood that when the target PDSCH has the corresponding target HARQ-ACK codebook and the target HARQ-ACK codebook corresponds to the type-2 HARQ-ACK codebook, HARQ-ACK bits corresponding to the target PDSCH are definitely present in the target HARQ-ACK codebook.

In this case, a first HARQ-ACK bit in the target HARQ-ACK codebook is set in any one of the following manners (1)-(4), where the first HARQ-ACK bit corresponds to the target PDSCH.

(1) Setting the first HARQ-ACK bit to a first predetermined value.

The first predetermined value may be ACK. To be specific, assuming that the target PDSCH can always be transmitted correctly at one time, the first HARQ-ACK bit is always set to ACK. Optionally, the first HARQ-ACK bit may alternatively be set to NACK.

(2) Setting the first HARQ-ACK bit based on a decoding result of the target PDSCH.

The value setting of the first HARQ-ACK bit is consistent with that when no HARQ-ACK disabling scheme is configured. For example, when the decoding result is decoding failure, the value of the first HARQ-ACK bit may be set to NACK; when the decoding result is decoding success, the value of the first HARQ-ACK bit may be set to ACK.

(3) Setting the first HARQ-ACK bit as if there is no transmission of the target PDSCH.

The setting manner of the first HARQ-ACK bit varies with the type-2 HARQ-ACK codebook. For example, in a case that the target HARQ-ACK codebook corresponds to a Type-1 codebook, the first HARQ-ACK bit is set to a second predetermined value. That is, for Type-1 codebook, the first HARQ-ACK bit may be set to a default value (that is, the second predetermined value), where the second predetermined value may be but is not limited to NACK.

For another example, in a case that the target HARQ-ACK codebook corresponds to a Type-3 codebook, the first HARQ-ACK bit is set based on a first PDSCH, where the first PDSCH corresponds to a same HARQ process as the target PDSCH, and a transmission time of the first PDSCH is earlier than the transmission time of the target PDSCH. That is, assuming that the target PDSCH is an SPS PDSCH, for Type-3 codebook, if a latest PDSCH transmission of a HARQ process is a non-feedback SPS PDSCH, bits corresponding to the HARQ process are set based on setting of the first HARQ-ACK bit for the dynamically scheduled PDSCH transmission or normal SPS PDSCH transmission for this HARQ process that is before the non-feedback SPS PDSCH.

(4) There is no limitation on how the first HARQ-ACK bit is set at a transmit end, and a receive end ignores the value of the first HARQ-ACK bit.

In this case, how the first HARQ-ACK bit is set at the transmit end (for example, the terminal) may be implemented based on HARQ-ACK bits, or the first HARQ-ACK bit is set to any value because these HARQ-ACK bits are directly ignored at the receive end (for example, the network device) without additional influences.

It should be noted that for Type-1 codebook, only when HARQ-ACK feedback points to a PDSCH of an uplink time unit in which a codebook transmission is performed, values of corresponding HARQ-ACK bits (in the codebook) are valid. Therefore, for a non-feedback SPS PDSCH, only when the non-feedback SPS PDSCH has a corresponding nominal HARQ-ACK feedback time unit that is the uplink time unit in which the Type-1 codebook transmission is performed, HARQ-ACK bits corresponding to the non-feedback SPS PDSCH are present in Type-1 codebook. It should be noted that for an uplink time unit (for example, an uplink slot or sub-slot), if there is no HARQ-ACK feedback for dynamically scheduled PDSCHs or SPS release apart from HARQ-ACK corresponding to the non-feedback SPS PDSCH, normal Type-1 codebook is not reported. In this case, reference may be made to corresponding processing for SPS HARQ-ACK only in the type-1 HARQ-ACK codebook. When the non-feedback SPS PDSCH has no corresponding nominal HARQ-ACK feedback time unit, the non-feedback SPS PDSCH does not correspond to Type-1 codebook in any uplink time unit.

Type-3 codebooks are organized based on HARQ processes, so it is unnecessary to consider whether the non-feedback SPS PDSCH has the corresponding nominal HARQ-ACK feedback time unit. Only when a latest PDSCH transmission of a HARQ process is a non-feedback SPS PDSCH, it can be considered that HARQ-ACK bits corresponding to the non-feedback SPS PDSCH are present in Type-3 codebook including HARQ-ACK of this HARQ process.

It can be understood that when HARQ-ACK bits are set to ACK, bit values thereof may be set to 1; and when HARQ-ACK bits are set to NACK, bit values thereof may be set to 0.

In some cases, for the type-2 HARQ-ACK codebook, when first HARQ-ACK bits are present in the codebook, these first HARQ-ACK bits may be deleted from the codebook during actual transmission of the codebook, and only a (new) codebook constituted by other HARQ-ACK bits in the codebook is transmitted. However, this manner may lead to inconsistent understandings of two sides on the number of bits of a transmission codebook when there is missed detection on DCI at the terminal side, thus influencing HARQ-ACK feedback performance.

Based on the foregoing two implementations, as specified a related protocol, when the number of bits of uplink control information (UCI) carried on a PUCCH is not greater than 11 (that is, $O_{ACK}+O_{SR}+O_{CSI}\leq 11$, where $O_{ACK}$, $O_{SR}$, and $O_{CSI}$ are respectively a HARQ-ACK codebook size, the number of scheduling request (SR) bits and the number of channel state information (CSI) bits), the number of valid HARQ-ACK bits in Type-1 codebook or Type-2 codebook, that is, a PUCCH power control variable $n_{HARQ-ACK}$, needs to be calculated, so as to determine an adjustment amount of PUCCH transmit power.

The following describes calculation of the PUCCH power control variable for different codebook types.

(1) For the type-1 HARQ-ACK codebook (including Type-2 codebook), when the codebook is actually transmitted, the codebook does not include HARQ-ACK bits corresponding to a non-feedback SPS PDSCH. In this case, in the calculation of the PUCCH power control variable $n_{HARQ-ACK}$, the HARQ-ACK bits corresponding to the non-feedback SPS PDSCH are also excluded, or the non-feedback SPS PDSCH is excluded, that is, the non-feedback SPS PDSCH is not incorporated into PDSCH or TB count.

(2) For the type-2 HARQ-ACK codebook, because the number of UCI bits being not greater than 11 is not considered currently in Type-3 codebook, this embodiment describes only the calculation of the PUCCH power control variable corresponding to Type-1 codebook.

In a case that the target HARQ-ACK codebook corresponds to a Type-1 codebook, a PUCCH power control variable corresponding to the target HARQ-ACK codebook (corresponding to Type-1 codebook) can be calculated in the following manner (21) or (22).

(21) In a case of calculating the PUCCH power control variable, incorporating the target PDSCH into a count of received PDSCHs. In this calculation manner, it can be considered that in the calculation of the PUCCH power control variable $n_{HARQ-ACK}$, a first HARQ-ACK bit corresponding to the non-feedback SPS PDSCH is considered, or the non-feedback SPS PDSCH or TB (transport block) or CBG (code block group) carried on the non-feedback SPS PDSCH is considered. The calculation manner may follow the existing protocol provisions.

In addition, a setting manner of the first HARQ-ACK bit may include setting the first HARQ-ACK bit to a first predetermined value or setting the first HARQ-ACK bit based on a decoding result of the target PDSCH. For details, reference may specifically be made to the foregoing related descriptions. To avoid repetition, details are not described herein again.

(22) In a case of calculating the PUCCH power control variable, skipping considering the target PDSCH (or excluding the non-feedback SPS PDSCH, that is, skipping incorporating the non-feedback SPS PDSCH into PDSCH or TB count). In this calculation manner, it can be considered that in the calculation of the PUCCH power control variable $n_{HARQ-ACK}$, the first HARQ-ACK bit corresponding to the non-feedback SPS PDSCH is not considered, or the non-feedback SPS PDSCH or the TB (transport block) or CBG (code block group) carried on the non-feedback SPS PDSCH is not considered, that is, the non-feedback SPS PDSCH is excluded from the calculation of the PUCCH power control variable $n_{HARQ-ACK}$.

In addition, the foregoing setting manner of the first HARQ-ACK bit may be setting the first HARQ-ACK bit as if there is no transmission of the target PDSCH. For details, reference may specifically be made to the foregoing related descriptions. To avoid repetition, details are not described herein again.

In this example 3, for the target PDSCH, the target HARQ-ACK codebook corresponding to the target PDSCH and the PUCCH power control variable are determined based on the transmission time of the target PDSCH, thus guaranteeing communication performance.

Example 4

Example 4 describes how S310 is implemented in a case that the predetermined operation is determining application of a first rule.

In a first implementation, in a case that the target PDSCH is configured as having no feedback of the target HARQ-ACK information, the determining application of a first rule includes any one of the following (1) and (2).

(1) The first rule does not apply to the target PDSCH.

It may be uniformly specified that the first rule does not apply to the target PDSCH, including a non-feedback SPS PDSCH, because the target PDSCH has no actual HARQ-ACK feedback based on configuration. In some situations, in a case that the target PDSCH does not correspond to a nominal HARQ-ACK feedback time unit, the first rule does not apply to the target PDSCH, that is, the first rule does not apply to the target PDSCH because the target PDSCH has no corresponding HARQ-ACK feedback time; and in a case that the target PDSCH corresponds to a nominal HARQ-ACK feedback time unit, the first rule applies to the target PDSCH.

(2) The first rule applies to the target PDSCH.

It may be uniformly specified that the first rule is still applicable to the target PDSCH, including the non-feedback SPS PDSCH. In this case, when the first rule is applied, a HARQ-ACK feedback time corresponding to the target PDSCH needs to be used. At this point, in a case that the target PDSCH corresponds to a nominal HARQ-ACK feedback time unit, the first rule is applied with the nominal HARQ-ACK feedback time unit corresponding to the target PDSCH as a corresponding HARQ-ACK feedback time; and in a case that the target PDSCH does not correspond to a nominal HARQ-ACK feedback time unit, other manners can be used for determining a HARQ-ACK feedback time corresponding to the target PDSCH and applying the first rule.

In some situations, in a case that the target PDSCH corresponds to a nominal HARQ-ACK feedback time unit, the first rule applies to the target PDSCH. In this case, the first rule can be applied based on a nominal HARQ-ACK feedback time unit corresponding to a non-feedback target PDSCH. It can be understood that in a case that the first rule applies to the target PDSCH, a first feedback time corresponding to the target HARQ-ACK information can be used as a second nominal HARQ-ACK feedback time unit corresponding to the target PDSCH.

The second nominal HARQ-ACK feedback time unit may be the same as the first nominal HARQ-ACK feedback time unit in the foregoing example 1, or the second nominal HARQ-ACK feedback time unit is configured by higher-layer signaling or specified by a protocol. This is not limited herein. It can be understood that in a case that the second nominal HARQ-ACK feedback time unit is the same as the first nominal HARQ-ACK feedback time unit in the foregoing example 1, for a process of determining the second nominal HARQ-ACK feedback time unit, reference may be made to the related descriptions of the first nominal HARQ-ACK feedback time unit in the foregoing example 1, and details are not described herein again.

In a second implementation, in a case that there is feedback delay for the target HARQ-ACK information corresponding to the target PDSCH, the determining application of a first rule includes any one of the following (1) or (2).

(1) The first rule does not apply to the target PDSCH.

It can be understood that for the target PDSCH, feedback cannot be implemented actually at a predefined HARQ-ACK feedback position, so the first rule does not apply to the target PDSCH. A position of delayed HARQ-ACK feedback can be considered as HARQ-ACK retransmission. Based on a NR-U conclusion for relaxing an OoO requirement for retransmission of HARQ-ACK (that is, the OoO requirement is applied only to an assigned initial HARQ-ACK transmission occasion (assigned initial HARQ-ACK transmission occasion)), and an OoO rule (that is, the first rule) is not required to be applied.

(2) The first rule applies to the target PDSCH.

It can be understood that the OoO rule between PDSCH reception and HARQ-ACK feedback applies to the target PDSCH. In this case, a second feedback time for applying the OoO rule can be determined in any one of the following manners (1)-(3), where the second feedback time is a feedback time of the target HARQ-ACK information corresponding to the target PDSCH.

(1) Determining the second feedback time based on the transmission time and a first time indicated by predetermined indication information, where the transmission time is a transmission end time of the target PDSCH, or the transmission time is a time unit to which the transmission end time of the target PDSCH belongs.

(2) Determining the second feedback time based on the transmission time and a feedback delay duration, where the feedback delay duration is determined based on a feedback delay time of the target HARQ-ACK information.

(3) In a case that the target PDSCH corresponds to a second nominal HARQ-ACK feedback time unit, determining the second feedback time based on the second nominal HARQ-ACK feedback time unit.

Example 5

In this example 5, the implementation process of S310 is described based on the predetermined operation being the determining start of a target DRX timer.

In a case that the target PDSCH is configured as having no feedback of the target HARQ-ACK information and having a DRX mechanism enabled, the target DRX timer includes a downlink HARQ round trip time timer drx-HARQ-RTT-TimerDL and a downlink retransmission timer drx-Retransmission-TimerDL.

In this example, the determining start of a target DRX timer may include any one of the following (1)-(4).

(1) After the target PDSCH has been received, skipping starting the drx-HARQ-RTT-TimerDL or the drx-Retransmission-TimerDL.

(2) After the target PDSCH has been received, starting the drx-HARQ-RTT-TimerDL, and in a case that the drx-HARQ-RTT-TimerDL expires, skipping starting the drx-Retransmission-TimerDL.

(3) After the target PDSCH has been received, starting the drx-HARQ-RTT-TimerDL, and in a case that the drx-HARQ-RTT-TimerDL expires and the first HARQ process is not decoded successfully, starting the drx-Retransmission-TimerDL.

(4) After the target PDSCH has been received, skipping starting the drx-HARQ-RTT-TimerDL, but starting the drx-Retransmission-TimerDL.

In the foregoing four implementations, the starting the drx-HARQ-RTT-TimerDL may include: starting the drx-HARQ-RTT-TimerDL at a third feedback time, where the third feedback time is determined in any one of the following manners (a)-(d).

(a) Determining the third feedback time based on the transmission time, where the transmission time is a transmission end time of the target PDSCH, or the transmission time is a time unit to which the transmission end time of the target PDSCH belongs.

(b) Determining the third feedback time based on the transmission time and a first time indicated by predetermined indication information.

(c) Determining the third feedback time based on the transmission time and a predetermined duration.

(d) In a case that the target PDSCH corresponds to a second nominal HARQ-ACK feedback time unit, determining the third feedback time based on the second nominal HARQ-ACK feedback time unit.

For a process of determining the third feedback time based on (a)-(d), reference may be made to the related descriptions in the foregoing examples. To avoid repetition, details are not described herein again.

Based on the foregoing examples, an implementation process of the communication processing method in this embodiment may include one or more of the foregoing examples 1-5, depending on the predetermined operation. For example, in a case that the predetermined operation includes determining whether the target PDSCH corresponds to a nominal HARQ-ACK feedback time unit and determining an effective time of a target MAC CE, the implementation process of the communication processing method may include the implementations in example 1 and example 2. This is not limited in this embodiment.

In addition, in the communication processing method 300 in this embodiment, for different target PDSCHs and/or predetermined operations, a series of adaptive solutions are introduced to guarantee communication performance.

For example, when an SPS Config adopts a HARQ-ACK disabling scheme, for functions and processes that relay on or are associated with HARQ-ACK feedback, a series of adaptive solutions are introduced, so as to ensure that the HARQ-ACK disabling scheme can be applied entirely, thereby reducing SPS HARQ-ACK feedback load.

For another example, when feedback of SPS HARQ-ACK in a TDD system is delayed, for functions and processes that rely on or are associated with HARQ-ACK feedback, a series of adaptive solutions are introduced, thereby ensuring consistent understanding of two sides of UE and a network.

It should be noted that in the foregoing embodiments, all communication devices (including a terminal side device and a network side device) involved in the communication processing process have a consistent understanding of the communication processing method. For example, when the terminal side device performs a predetermined operation based on a transmission time of a target PDSCH, a corresponding protocol or configuration is preset in the network side device corresponding to the terminal side device, so that the network side device can understand the foregoing operation performed by the terminal side device, thereby guaranteeing smooth implementation of the communication process.

In addition, the communication processing method provided in the embodiments of this application may be performed by a communication processing apparatus or a control module for performing the communication processing method in the communication processing apparatus. The embodiments of this application use the communication processing apparatus performing the communication processing method as an example to describe the communication processing apparatus provided in the embodiments of this application.

Figure 4:
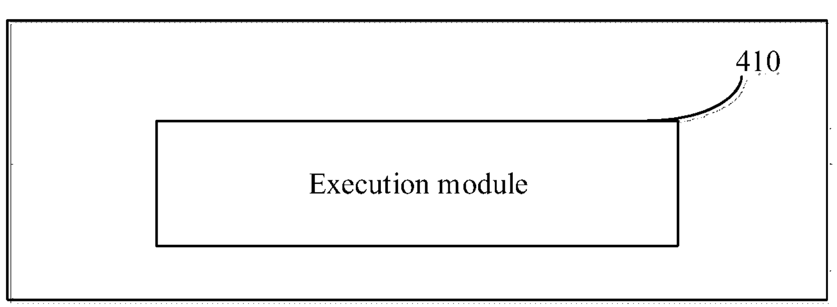
FIG. 4 is a block diagram of a communication processing apparatus according to an example embodiment of this application.

FIG. 4 is a block diagram of a communication processing apparatus 400 according to an example embodiment of this application. The apparatus includes an execution module 410 configured to perform a predetermined operation based on a transmission time of a target physical downlink shared channel PDSCH, where the target PDSCH is configured as having no feedback of target hybrid automatic repeat request acknowledgement HARQ-ACK information, or there is feedback delay for target HARQ-ACK information corresponding to the target PDSCH. The predetermined operation includes at least one of the following: determining whether the target PDSCH corresponds to a nominal HARQ-ACK feedback time unit; determining an effective time of a target MAC CE, where the target MAC CE is carried on the target PDSCH; determining a target HARQ-ACK codebook corresponding to the target PDSCH; determining application of a first rule, where the first rule characterizes a timing relationship requirement between the target PDSCH and a feedback time corresponding to the target HARQ-ACK information; and determining start of a target discontinuous reception DRX timer, where the target DRX timer corresponds to a first HARQ process, and the first HARQ process corresponds to the target PDSCH.

In a possible implementation, in a case that the predetermined operation is determining whether the target PDSCH corresponds to a nominal HARQ-ACK feedback time unit, the determining, by the execution module 410, whether the target PDSCH corresponds to a nominal HARQ-ACK feedback time unit includes any one of the following: the target PDSCH not corresponding to a first nominal HARQ-ACK feedback time unit; and the target PDSCH corresponding to a first nominal HARQ-ACK feedback time unit.

In another possible implementation, in a case that the target PDSCH corresponds to a first nominal HARQ-ACK feedback time unit, the execution module 410 is configured to perform any one of the following: determining the first nominal HARQ-ACK feedback time unit based on the transmission time and a first time indicated by predetermined indication information; and determining the first nominal HARQ-ACK feedback time unit based on the transmission time and a predefined duration; where the transmission time is a transmission end time of the target PDSCH, or the transmission time is a time unit to which the transmission end time of the target PDSCH belongs.

In another possible implementation, in a case that the target PDSCH is configured as having no feedback of the target HARQ-ACK information and the predetermined operation is determining an effective time of a target MAC CE, the execution module 410 is configured to perform any one of the following: determining the effective time of the target MAC CE based on the transmission time; determining the effective time of the target MAC CE based on the transmission time and a first time indicated by predetermined indication information; determining the effective time of the target MAC CE based on the transmission time and a predefined duration; and in a case that the target PDSCH corresponds to a second nominal HARQ-ACK feedback time unit, determining the effective time of the target MAC CE based on the second nominal HARQ-ACK feedback time unit; where the transmission time is a transmission end time of the target PDSCH, or the transmission time is a time unit to which the transmission end time of the target PDSCH belongs.

In another possible implementation, in a case that there is feedback delay for the target HARQ-ACK information corresponding to the target PDSCH and the predetermined operation is determining an effective time of a target MAC CE, the execution module 410 is configured to perform any one of the following: determining the effective time of the target MAC CE based on the transmission time and a first time indicated by predetermined indication information; determining the effective time of the target MAC CE based on the transmission time and a feedback delay duration; and in a case that the target PDSCH corresponds to a second nominal HARQ-ACK feedback time unit, determining the effective time of the target MAC CE based on the second nominal HARQ-ACK feedback time unit; where the transmission time is a transmission end time of the target PDSCH, or the transmission time is a time unit to which the transmission end time of the target PDSCH belongs; and the feedback delay duration is determined based on a feedback delay time of the target HARQ-ACK information.

In another possible implementation, in a case that the target PDSCH is configured as having no feedback of the target HARQ-ACK information and the predetermined operation is determining a target HARQ-ACK codebook corresponding to the target PDSCH, the execution module 410 is configured to include any one of the following: in a case that the target PDSCH does not correspond to a second nominal HARQ-ACK feedback time unit, the target PDSCH having no corresponding target HARQ-ACK codebook; and in a case that the target PDSCH corresponds to a second nominal HARQ-ACK feedback time unit, the target PDSCH having a corresponding target HARQ-ACK codebook.

In another possible implementation, in a case that the target PDSCH corresponds to a target HARQ-ACK codebook, that is, in this implementation, the target HARQ-ACK codebook is an actual to-be-transmitted codebook, the target HARQ-ACK codebook may correspond to a type-1 HARQ-ACK codebook or a type-2 HARQ-ACK codebook.

In another possible implementation, the type-1 HARQ-ACK codebook includes any one of the following: codebook including semi-persistent scheduling HARQ-ACK only; type-2 codebook (Type-2 codebook); and enhanced (enhanced) Type-2 codebook; and/or the type-2 HARQ-ACK codebook includes any one of the following: Type-1 codebook; and Type-3 codebook.

In another possible implementation, in a case that the target HARQ-ACK codebook corresponds to a codebook including only semi-persistent scheduling HARQ-ACK, an SPS HARQ-ACK bit sequence corresponding to the target HARQ-ACK codebook does not include a HARQ-ACK bit or HARQ-ACK bit sequence corresponding to the target PDSCH.

In another possible implementation, in a case that the target HARQ-ACK codebook corresponds to a type-1 HARQ-ACK codebook, the execution module 410 is further configured to perform any one of the following: reporting no HARQ-ACK information in the second nominal HARQ-ACK feedback time unit; and reporting first HARQ-ACK information in the second nominal HARQ-ACK feedback time unit, where the first HARQ-ACK information is HARQ-ACK information other than the target HARQ-ACK information.

In another possible implementation, in a case that the target HARQ-ACK codebook corresponds to a type-2 HARQ-ACK codebook, a first HARQ-ACK bit in the target HARQ-ACK codebook is set in any one of the following manners: setting the first HARQ-ACK bit to a first predetermined value; setting the first HARQ-ACK bit based on a decoding result of the target PDSCH; and setting the first HARQ-ACK bit as if there is no transmission of the target PDSCH; where the first HARQ-ACK bit corresponds to the target PDSCH.

In another possible implementation, the setting the first HARQ-ACK bit as if there is no transmission of the target PDSCH includes: in a case that the target HARQ-ACK codebook corresponds to a Type-1 codebook, setting the first HARQ-ACK bit to a second predetermined value; and in a case that the target HARQ-ACK codebook corresponds to a Type-3 codebook, setting the first HARQ-ACK bit based on a first PDSCH, where the first PDSCH corresponds to a same HARQ process as the target PDSCH, and a transmission time of the first PDSCH is earlier than the transmission time of the target PDSCH.

In another possible implementation, the execution module 410 is further configured to: in a case that the target HARQ-ACK codebook corresponds to a Type-1 codebook, calculate a physical uplink control channel PUCCH power control variable corresponding to the target HARQ-ACK codebook through any one of the following: in a case of calculating the PUCCH power control variable, incorporating the target PDSCH into a count of received PDSCHs; and in a case of calculating the PUCCH power control variable, skipping considering the target PDSCH.

In another possible implementation, in a case that the target PDSCH is configured as having no feedback of the target HARQ-ACK information, the determining application of a first rule includes any one of the following: the first rule does not apply to the target PDSCH; and the first rule applies to the target PDSCH.

In another possible implementation, in a case that the first rule applies to the target PDSCH, a first feedback time corresponding to the target HARQ-ACK information is a second nominal HARQ-ACK feedback time unit corresponding to the target PDSCH.

In another possible implementation, in a case that there is feedback delay for the target HARQ-ACK information corresponding to the target PDSCH, the determining application of a first rule includes any one of the following: the first rule does not apply to the target PDSCH; and the first rule applies to the target PDSCH.

In another possible implementation, in a case that the first rule applies to the target PDSCH, a second feedback time of the target HARQ-ACK information corresponding to the target PDSCH is determined in any one of the following manners: determining the second feedback time based on the transmission time and a first time indicated by predetermined indication information; determining the second feedback time based on the transmission time and a feedback delay duration; and in a case that the target PDSCH corresponds to a second nominal HARQ-ACK feedback time unit, determining the second feedback time based on the second nominal HARQ-ACK feedback time unit; where the transmission time is a transmission end time of the target PDSCH, or the transmission time is a time unit to which the transmission end time of the target PDSCH belongs; and the feedback delay duration is determined based on a feedback delay time of the target HARQ-ACK information.

In another possible implementation, in a case that the target PDSCH is configured as having no feedback of target HARQ-ACK information and having a DRX mechanism enabled, the target DRX timer includes a downlink HARQ round trip time timer drx-HARQ-RTT-TimerDL and a downlink retransmission timer drx-Retransmission-TimerDL.

In another possible implementation, the determining start of a target DRX timer includes any one of the following: skipping starting the drx-HARQ-RTT-TimerDL and the drx-Retransmission-TimerDL; starting the drx-HARQ-RTT-TimerDL, and in a case that the drx-HARQ-RTT-TimerDL expires, skipping starting the drx-Retransmission-TimerDL; starting the drx-HARQ-RTT-TimerDL, and in a case that the drx-HARQ-RTT-TimerDL expires and the first HARQ process is not decoded successfully, starting the drx-Retransmission-TimerDL; and skipping starting the drx-HARQ-RTT-TimerDL, but starting the drx-Retransmission-TimerDL.

In another possible implementation, the starting the drx-HARQ-RTT-TimerDL includes: starting the drx-HARQ-RTT-TimerDL at a third feedback time, where the third feedback time is determined in any one of the following manners: determining the third feedback time based on the transmission time; determining the third feedback time based on the transmission time and a first time indicated by predetermined indication information; determining the third feedback time based on the transmission time and a predetermined duration; and in a case that the target PDSCH corresponds to a second nominal HARQ-ACK feedback time unit, determining the third feedback time based on the second nominal HARQ-ACK feedback time unit; where the transmission time is a transmission end time of the target PDSCH, or the transmission time is a time unit to which the transmission end time of the target PDSCH belongs.

In another possible implementation, the predetermined indication information includes activation DCI, reactivation DCI, or higher-layer signaling.

In another possible implementation, the predetermined duration includes a predetermined quantity of time units.

In another possible implementation, the time unit includes any one of a symbol, a sub-slot, and a slot.

In another possible implementation, the target PDSCH includes SPS PDSCH.

The communication processing apparatus 400 provided in this embodiment of this application is capable of implementing the processes implemented in the method embodiments in FIG. 2 and FIG. 3, with the same technical effects achieved. To avoid repetition, details are not described herein again.

The communication processing apparatus 400 in this embodiment of this application may be an apparatus or may be a component, an integrated circuit, or a chip in a terminal. The apparatus may be a mobile terminal or a non-mobile terminal. For example, the mobile terminal may include but is not limited to a type of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The communication processing apparatus in this embodiment of this application may be an apparatus with an operating system. The operating system may be an Android operating system, an iOS operating system, or other possible operating systems, and is not specifically limited in this embodiment of this application.

Figure 5:
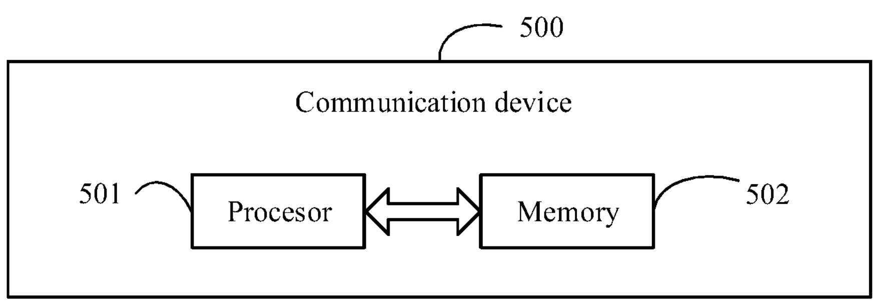
FIG. 5 is a block diagram of a communication device according to an example embodiment of this application.

As shown in FIG. 5, an example embodiment of this application further provides a communication device 500, including a processor 501, a memory 502, a program or instructions stored in the memory 502 and capable of running on the processor 501. For example, when the communication device 500 is a terminal, the program or instructions are executed by the processor 501 to implement the processes of the foregoing communication processing method embodiment, with the same technical effects achieved. When the communication device 500 is a network device and when the program or the instructions are executed by the processor 501, the processes of the foregoing communication processing method embodiment are implemented, with the same technical effects achieved. To avoid repetition, details are not described herein again.

Figure 6:
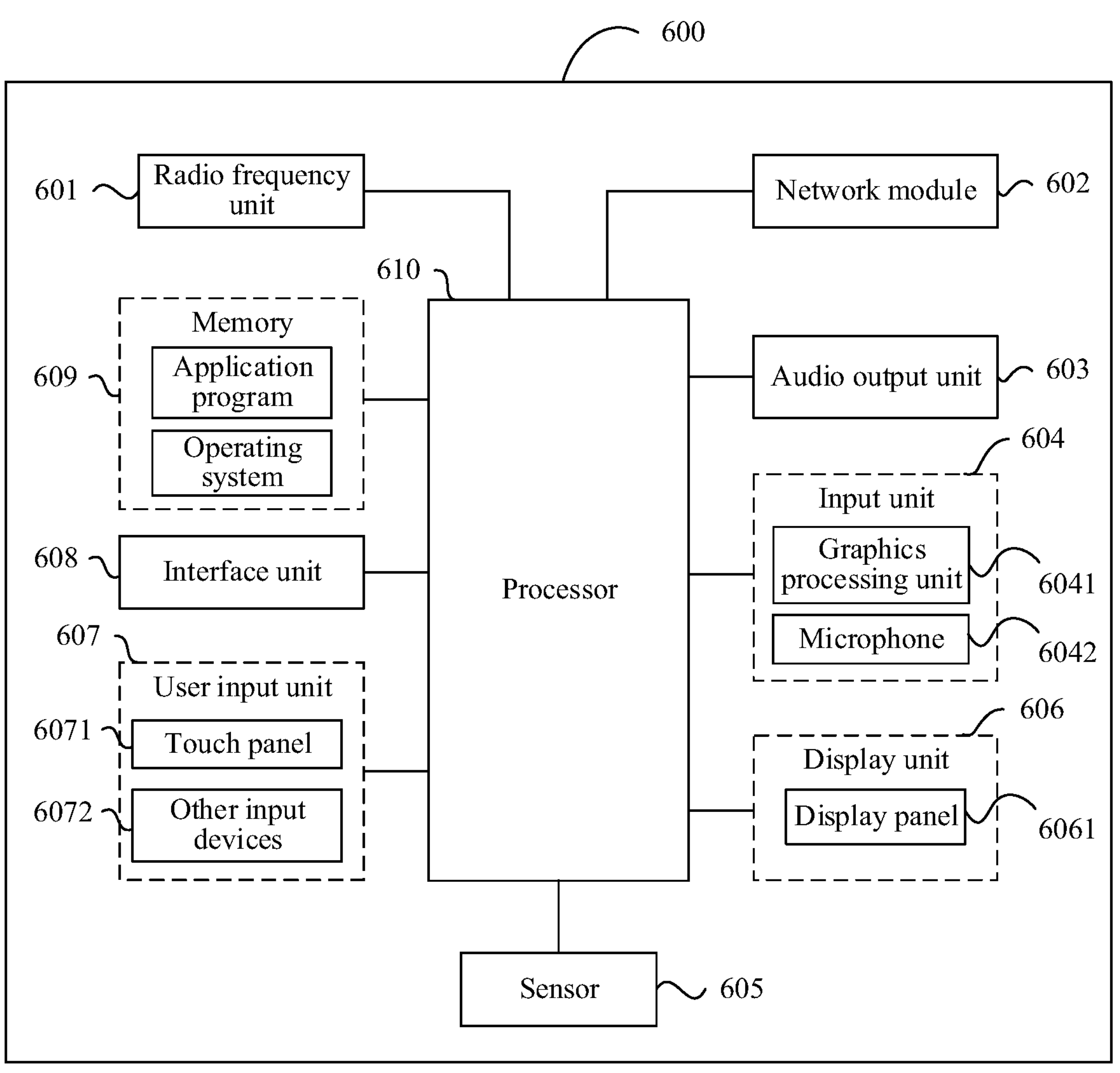
FIG. 6 is a block diagram of a user terminal according to an example embodiment of this application.

In an implementation, the communication device 500 may be a terminal. For example, FIG. 6 is a schematic diagram of a hardware structure of a terminal according to an example embodiment of this application. The terminal 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

Persons skilled in the art can understand that the terminal 600 may further include a power supply (such as a battery) for supplying power to the components. The power supply may be logically connected to the processor 610 via a power management system. In this way, functions such as charge management, discharge management, and power consumption management are implemented via the power management system. The structure of the terminal shown in FIG. 6 does not constitute any limitation on the terminal. The terminal may include more or fewer components than shown in the figure, or combine some of the components, or have different arrangements of the components. Details are not described herein again.

It can be understood that in this embodiment of this application, the input unit 604 may include a graphics processing unit (GPU) 6041 and a microphone 6042. The graphics processing unit 6041 processes image data of a static picture or video acquired by an image capture apparatus (for example, camera) in a picture capture mode or video capture mode. The display unit 606 may include a display panel 6061, and the display panel 6061 may be configured in a form of a liquid crystal display, an organic light-emitting diode, or the like. The user input unit 607 includes a touch panel 6071 and other input devices 6072. The touch panel 6071 is also referred to as a touchscreen. The touch panel 6071 may include two parts: a touch detection apparatus and a touch controller. The other input devices 6072 may include but are not limited to a physical keyboard, a function button (such as a volume control button or a power button), a trackball, a mouse, and a joystick. Details are not described herein.

In this embodiment of this application, the radio frequency unit 601 receives downlink data from a network device, and then sends the downlink data to the processor 610 for processing; and also sends uplink data to the network device. Generally, the radio frequency unit 601 includes but is not limited to an antenna, at least one amplifier, a transceiver, a coupler, a low noise amplifier, and a duplexer.

The memory 609 may be configured to store software programs or instructions and various data. The memory 609 may mainly include a program or instruction storage region and a data storage region. The program or instruction storage region may store an operating system, an application program or instructions required by at least one function (for example, an audio play function or an image play function), and the like. In addition, the memory 609 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, flash storage device, or other volatile solid-state storage device.

The processor 610 may include one or more processing units. Optionally, the processor 610 may integrate an application processor and a modem processor. The application processor mainly processes an operating system, user interface, application programs or instructions, and the like. The modem processor mainly processes wireless communication, for example, being a baseband processor. It can be understood that the modem processor may alternatively be not integrated in the processor 610.

The processor 610 invokes the program or instructions in the memory 609 to perform the method performed by the modules in FIG. 4, with the same technical effects achieved. To avoid repetition, details are not described herein again.

Figure 7:
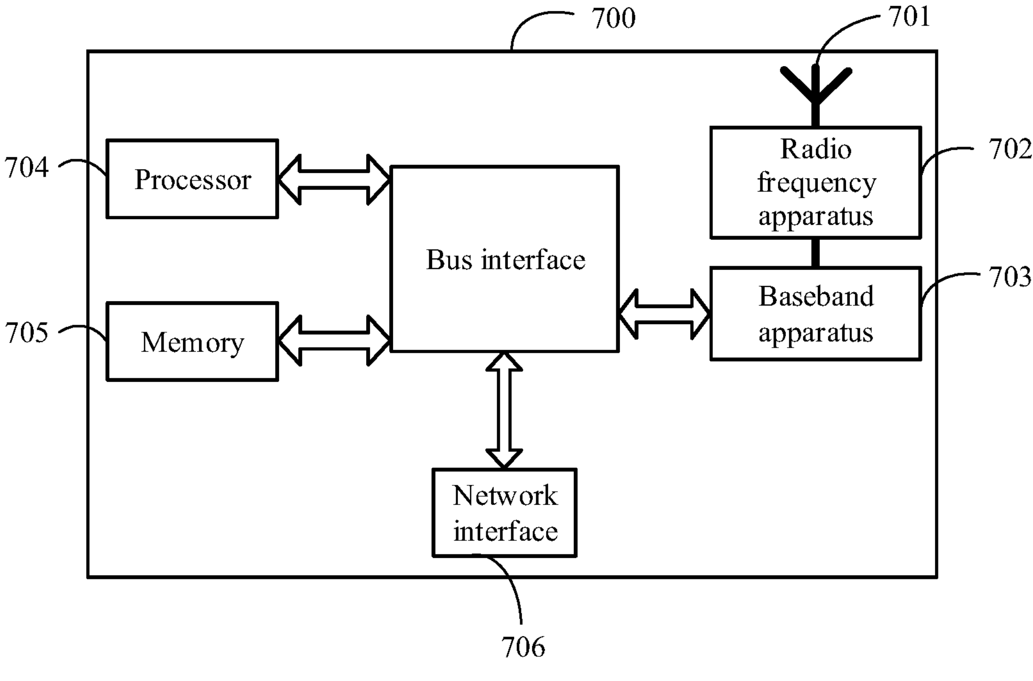
FIG. 7 is a block diagram of a network device according to an example embodiment of this application.

In another implementation, the communication device 500 may alternatively be a network device. The network device is shown in FIG. 7 which is a block diagram of a network device 700. The network device may include an antenna 701, a radio frequency apparatus 702, and a baseband apparatus 703. The antenna 701 is connected to the radio frequency apparatus 702. In an uplink direction, the radio frequency apparatus 702 receives information via the antenna 701, and sends the received information to the baseband apparatus 703 for processing. In a downlink direction, the baseband apparatus 703 processes to-be-sent information, and sends the information to the radio frequency apparatus 702; and the radio frequency apparatus 702 processes the information received and then sends the information via the antenna 701.

The band processor may be located in the baseband apparatus 703. The method performed by the network device in the foregoing embodiment may be implemented by the baseband apparatus 703, and the baseband apparatus 703 includes a processor 704 and a memory 705.

The baseband apparatus 703 may include, for example, at least one baseband board, where a plurality of chips are disposed on the baseband board. As shown in FIG. 7, one of the chips, for example, the processor 704, is connected to the memory 705, to invoke the program in the memory 705 so as to perform the operations of the network device as given in the foregoing method embodiment.

The baseband apparatus 703 may further include a network interface 706, configured to exchange information with the radio frequency apparatus 702, where the interface is, for example, a common public radio interface (CPRI).

Specifically, the network device in this embodiment of this application further includes: instructions or a program stored in the memory 705 and capable of running on the processor 704. The processor 704 invokes the instructions or program in the memory 705 to execute the method executed by the modules shown in FIG. 4, with the same technical effects achieved. To avoid repetition, details are not described herein again.

An embodiment of this application further provides a readable storage medium, where a program or instructions are stored in the readable storage medium. When the program or instructions are executed by a processor, the processes of the foregoing communication processing method embodiment can be implemented, with the same technical effects achieved. To avoid repetition, details are not described herein again.

The processor is a processor in the terminal described in the foregoing embodiment. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or instructions of a network device to implement the processes of the communication processing method embodiment, with the same technical effects achieved. To avoid repetition, details are not described herein again.

It should be understood that the chip mentioned in this embodiment of this application may also be referred to as a system-level chip, a system chip, a chip system, a system-on-chip, or the like.

An embodiment of this application further provides a computer program product. The computer program product includes a processor, a memory, and a program or instructions stored in the memory and capable of running on the processor. When the program or instructions are executed by the processor, the processes of the foregoing communication processing method embodiment are implemented, with the same technical effects achieved. To avoid repetition, details are not described herein again.

It should be noted that in this specification, the terms "include", "comprise", or any of their variants are intended to cover a non-exclusive inclusion such that a process, a method, an article, or an apparatus that includes a series of elements not only includes those elements but also includes other elements that are not expressly listed, or further includes elements inherent to such process, method, article, or apparatus. In absence of more constraints, an element preceded by "includes a/an . . . " does not preclude the presence of other identical elements in the process, method, article, or apparatus that includes the element. In addition, it should be noted that the scope of the method and apparatus in the implementations of this application is not limited to executing functions in the order shown or discussed, but may also include executing functions in a substantially simultaneous manner or in a reverse order depending on the functions involved. For example, the described method may be performed in an order different from that described, and various steps may be added, omitted, or combined. In addition, features described with reference to some examples may be combined in other examples.

From the foregoing description of the implementations, persons skilled in the art may clearly understand that the method in the foregoing embodiments may be implemented by software in combination with a necessary general hardware platform, or certainly may be implemented by hardware. However, in many cases, the former is a preferred implementation. Based on such understanding, the technical solutions of this application essentially, or the part contributing to the prior art may be implemented in a form of a software product. The computer software product is stored in a storage medium (such as ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing has described the embodiments of this application with reference to the accompanying drawings. However, this application is not limited to the foregoing specific implementations. The specific implementations are illustrative rather than restrictive. Inspired by this application, persons of ordinary skill in the art may develop many other forms without departing from the principle of this application and the protection scope of the claims, and all such forms fall within the protection scope of this application.

What is claimed is:

1. A communication processing method, performed by a terminal or a network device, comprising:

performing a predetermined operation based on a transmission time of a target physical downlink shared channel PDSCH, in a case where the target PDSCH is configured as having no feedback of target hybrid automatic repeat request acknowledgement HARQ-ACK information, wherein the predetermined operation comprises:

determining a nominal HARQ-ACK feedback time unit corresponding to the target PDSCH, based on the transmission time and a first time indicated by predetermined indication information, wherein the transmission time is a time unit to which a transmission end time of the target PDSCH belongs, and the time unit is a slot or a sub-slot.

2. The method according to claim 1, wherein the predetermined operation further comprises: determining an effective time of a target media access control layer control element (MAC CE), and the target MAC CE is carried on the target PDSCH, wherein the determining the effective time of the target MAC CE comprises:

determining the effective time of the target MAC CE based on the transmission time and the first time indicated by the predetermined indication information; or determining the effective time of the target MAC CE based on the nominal HARQ-ACK feedback time unit corresponding to the target PDSCH.

3. The method according to claim 1, wherein the predetermined operation further comprises: determining whether the target PDSCH has a corresponding target HARQ-ACK codebook, in a case that the target PDSCH corresponds to a nominal HARQ-ACK feedback time unit, the target PDSCH has the corresponding target HARQ-ACK codebook, in a case that the target HARQ-ACK codebook corresponds to a codebook comprising semi-persistent scheduling HARQ-ACK only, an SPS HARQ-ACK bit sequence corresponding to the target HARQ-ACK codebook does not comprise a HARQ-ACK bit or HARQ-ACK bit sequence corresponding to the target PDSCH;

or in a case that the target HARQ-ACK codebook corresponds to a type-1 HARQ-ACK codebook, a first HARQ-ACK bit in the target HARQ-ACK codebook is set to NACK, and the first HARQ-ACK bit corresponds to the target PDSCH;

or in a case that the target HARQ-ACK codebook corresponds to a type-2 HARQ-ACK codebook, the terminal reports no HARQ-ACK information in the nominal HARQ-ACK feedback time unit; or, the terminal reports first HARQ-ACK information in the nominal HARQ-ACK feedback time unit, wherein first HARQ-ACK information is HARQ-ACK information other than the target HARQ-ACK information.

4. The method according to claim 3, wherein after the performing the predetermined operation, the method further comprises:

in a case that the target HARQ-ACK codebook corresponds to a Type-1 codebook, calculating a physical uplink control channel PUCCH power control variable corresponding to the target HARQ-ACK codebook through the following manners:

calculating the PUCCH power control variable without considering the target PDSCH, wherein the without considering the target PDSCH comprises;

excluding the target PDSCH, skipping incorporating the target PDSCH into PDSCH count or transport block (TB) count, not considering TB or code block group (CBG) carried on the target PDSCH.

5. The method according to claim 1, wherein the predetermined operation further comprises: determining application of a first rule, wherein the first rule characterizes a timing relationship requirement between the target PDSCH and a feedback time corresponding to the target HARQ-ACK information, a first feedback time corresponding to the target HARQ-ACK information is the second nominal HARQ-ACK feedback time unit corresponding to the target PDSCH.

6. The method according to claim 1, wherein in a case that the terminal is configured as having a discontinuous description (DRX) mechanism enabled, the predetermined operatic her comprises: skipping starting of a target DRX timer, wherein the target DRX timer corresponds to a first HARQ process, and the first HARQ process corresponds to the target PDSCH, the target DRX timer comprises a downlink HARQ round trip time timer (drx-HARQ-RTT-TimerDL) and a downlink retransmission timer (drx-Retransmission-TimerDL).

7. The method according to claim 1, wherein the predetermined indication information comprises activation downlink control information (DCI), reactivation DCI, or higher-layer signaling, and/or, the target PDSCH comprises SPS PDSCH or dynamically scheduled PDSCH.

8. A communication device, that is a terminal or a network device, comprising a processor, a memory, and a program or instructions stored in the memory and capable of running on the processor, wherein the program or instructions, when executed by the processor, causes the processor to perform the following steps:

performing a predetermined operation based on a transmission time of a target physical downlink shared channel PDSCH, in a case where the target PDSCH is configured as having no feedback of target hybrid automatic repeat request acknowledgement HARQ-ACK information, wherein the predetermined operation comprises:

determining a nominal HARQ-ACK feedback time unit corresponding to the target PDSCH, based on the transmission time and a first time indicated by predetermined indication information, wherein the transmission time is a time unit to which a transmission end time of the target PDSCH belongs, and the time unit is a slot or a sub-slot.

9. A non-transitory readable storage medium, wherein the readable storage medium stores a program or instructions, and the program or instructions, when executed by a processor, causes the processor to perform the following steps:

performing a predetermined operation based on a transmission time of a target physical downlink shared channel PDSCH, in a case where the target PDSCH is configured as having no feedback of target hybrid automatic repeat request acknowledgement HARQ-ACK information, wherein the predetermined operation comprises:

determining whether the target PDSCH corresponds to a nominal HARQ-ACK feedback time unit corresponding to the target PDSCH, based on the transmission time and a first time indicated by predetermined indication information, wherein the transmission time is a time unit to which a transmission end time of the target PDSCH belongs, and the time unit is a slot or a sub-slot.

10. The method according to claim 3, wherein after the performing the predetermined operation, the method further comprises:

in a case where the target HARQ-ACK codebook corresponds to the first HARQ-ACK codebook, calculating a PUCCH power control variable corresponding to the target HARQ-ACK codebook, wherein the calculating the PUCCH power control variable corresponding to the target HARQ-ACK codebook comprises:

excluding the target PDSCH in the calculating of the PUCCH power control variable, or not incorporating the target PDSCH into PDSCH count or TB count in the calculating of the PUCCH power control variable, the first HARQ-ACK codebook comprises at least one of the following:

a codebook comprising semi-persistent scheduling HARQ-ACK only;

Type-2 codebook;

enhanced Type-2 codebook.

11. The communication device according to claim 8, wherein the predetermined operation further comprises: determining an effective time of a target media access control layer control element (MAC CE), and the target MAC CE is carried on the target PDSCH, wherein the determining the effective time of the target MAC CE comprises:

determining the effective time of the target MAC CE based on the transmission time and the first time indicated by the predetermined indication information; or determining the effective time of the target MAC CE based on the nominal HARQ-ACK feedback time unit corresponding to the target PDSCH.

12. The communication device according to claim 8, wherein the predetermined operation further comprises: determining whether the target PDSCH has a corresponding target HARQ-ACK codebook, in a case that the target PDSCH corresponds to a nominal HARQ-ACK feedback time unit, the target PDSCH has the corresponding target HARQ-ACK codebook;

in a case that the target HARQ-ACK codebook corresponds to a codebook comprising semi-persistent scheduling HARQ-ACK only, an SPS HARQ-ACK bit sequence corresponding to the target HARQ-ACK codebook does not comprise a HARQ-ACK bit or HARQ-ACK bit sequence corresponding to the target PDSCH;

or, in a case that the target HARQ-ACK codebook corresponds to a type-1 HARQ-ACK codebook, a first HARQ-ACK bit in the target HARQ-ACK codebook is set to NACK, and the first HARQ-ACK bit corresponds to the target PDSCH;

or in a case that the target HARQ-ACK codebook corresponds to a type-2 HARQ-ACK codebook, the terminal reports no HARQ-ACK information in the nominal HARQ-ACK feedback time unit; or, the terminal reports first HARQ-ACK information in the nominal HARQ-ACK feedback time unit, wherein first HARQ-ACK information is HARQ-ACK information other than the target HARQ-ACK information.

13. The communication device according to claim 12, wherein after the performing the predetermined operation, the processor is further configured to: in a case that the target HARQ-ACK codebook corresponds to a Type-1 codebook, calculate a physical uplink control channel PUCCH power control variable corresponding to the target HARQ-ACK codebook through the following manners:

calculating the PUCCH power control variable without considering the target PDSCH, wherein the without considering the target PDSCH comprises:

excluding the target PDSCH, skipping incorporating the target PDSCH into PDSCH count or transport block (TB) count, not considering TB or code block group (CBG) carried on the target PDSCH.

14. The communication device according to claim 12, wherein after the performing the predetermined operation, the processor is further configured to: in a case where the target HARQ-ACK codebook corresponds to the first HARQ-ACK codebook, calculate a PUCCH power control variable corresponding to the target HARQ-ACK codebook, wherein the calculating the PUCCH power control variable corresponding to the target HARQ-ACK codebook comprises:

excluding the target PDSCH in the calculating of the PUCCH power control variable, or not incorporating the target PDSCH into PDSCH count or TB count in the calculating of the PUCCH power control variable, the first HARQ-ACK codebook comprises at least one of the following:

a codebook comprising semi-persistent scheduling HARQ-ACK only;

Type-2 codebook;

enhanced Type-2 codebook.

15. The communication device according to claim 8, wherein the predetermined operation further comprises: determining application of a first rule, wherein the first rule characterizes a timing relationship requirement between the target PDSCH and a feedback time corresponding to the target HARQ-ACK information, a first feedback time corresponding to the target HARQ-ACK information is the second nominal HARQ-ACK feedback time unit corresponding to the target PDSCH.

16. The communication device according to claim 8, wherein in a case that the terminal is configured as having a discontinuous reception (DRX) mechanism enabled, the predetermined operation further comprises: skipping starting of a target DRX timer, wherein the target DRX timer corresponds to a first HARQ process, and the first HARQ process corresponds to the target PDSCH, the target DRX timer comprises a downlink HARQ round trip time timer (drx-HARQ-RTT-TimerDL) and a downlink retransmission timer (drx-Retransmission-TimerDL).

17. The communication device according to claim 8, wherein the predetermined indication information comprises activation downlink control information (DCI), reactivation DCI, or higher-layer signaling, and/or, the target PDSCH comprises SPS PDSCH or dynamically scheduled PDSCH.

18. The non-transitory readable storage medium according to claim 9, wherein the predetermined operation further comprises: determining an effective time of a target media access control layer control element (MAC CE), and the target MAC CE is carried on the target PDSCH, wherein the determining the effective time of the target MAC CE comprises:

determining the effective time of the target MAC CE based on the transmission time and the first time indicated by the predetermined indication information; or determining the effective time of the target MAC CE based on the nominal HARQ-ACK feedback time unit corresponding to the target PDSCH.

19. The non-transitory readable storage medium according to claim 9, wherein the predetermined operation further comprises: determining whether the target PDSCH has a corresponding target HARQ-ACK codebook, in a case that the target PDSCH corresponds to a nominal HARQ-ACK feedback time unit, the target PDSCH has the corresponding target HARQ-ACK codebook;

in a case that the target HARQ-ACK codebook corresponds to a codebook comprising semi-persistent scheduling HARQ-ACK only, an SPS HARQ-ACK bit sequence corresponding to the target HARQ-ACK codebook does not comprise a HARQ-ACK bit or HARQ-ACK bit sequence corresponding to the target PDSCH;

or in a case that the target HARQ-ACK codebook corresponds to a type-1 HARQ-ACK codebook, a first HARQ-ACK bit in the target HARQ-ACK codebook is set to NACK, and the first HARQ-ACK bit corresponds to the target PDSCH;

or, in a case that the target HARQ-ACK codebook corresponds to a type-2 HARQ-ACK codebook, the terminal reports no HARQ-ACK information in the nominal HARQ-ACK feedback time unit; or, the terminal reports first HARQ-ACK information in the nominal HARQ-ACK feedback time unit, wherein first HARQ-ACK information is HARQ-ACK information other than the target HARQ-ACK information.

20. The non-transitory readable storage medium according to claim 9, wherein after the performing the predetermined operation, the method further comprises:

in a case that the target HARQ-ACK codebook corresponds to a Type-1 codebook, calculating a physical uplink control channel PUCCH power control variable corresponding to the target HARQ-ACK codebook through the following manners:

calculating the PUCCH power control variable without considering the target PDSCH, wherein the without considering the target PDSCH comprises:

excluding the target PDSCH, skipping incorporating the target PDSCH into PDSCH count or transport block (TB) count, not considering TB or code block group (CBG) carried on the target PDSCH.

* * * * *